US006865569B1

(12) United States Patent
Gui et al.

(10) Patent No.: US 6,865,569 B1
(45) Date of Patent: Mar. 8, 2005

(54) DETERMINING MATERIALIZED VIEW COVERAGE

(75) Inventors: Hong Gui, Madison, WI (US); Curt J. Ellmann, Madison, WI (US); Grace Au, Rancho Palos Verdes, CA (US); Ahmad S. Ghazal, Redondo Beach, CA (US)

(73) Assignee: NCR Corporation, Dayton, OH (US)

( * ) Notice: Subject to any disclaimer, the term of this patent is extended or adjusted under 35 U.S.C. 154(b) by 148 days.

(21) Appl. No.: 09/934,935

(22) Filed: Aug. 22, 2001

(51) Int. Cl.[7] .............................................. G06F 17/30
(52) U.S. Cl. ................................................. 707/3; 707/4
(58) Field of Search ............................... 707/1, 2, 3, 4, 707/5, 6, 7, 8, 9, 10, 100, 101, 102, 104.3

(56) References Cited

U.S. PATENT DOCUMENTS 6,026,390 A * 2/2000 Ross et al. ...................... 707/2
6,493,699 B2 * 12/2002 Colby et al. ................... 707/2

OTHER PUBLICATIONS

Wilburt J. Labio et al., "Physical Database Designs for Data Warehouses," ICDE, pp. 277–288 (1997).
Dallan Quass et al., "Making Views Self–Maintainable for Data Warehousing," PDIS, pp. 158–169 (1996).
Dallan Quass et al., "On–Line Warehouse View Maintenance," SIGMOD, pp. 393–404 (1997).
D. Agrawal et al., "Efficient View Maintenance at Data Warehouses," pp. 417–427 (1997).
Yue Zhuge et al., "The Strobe Algorithms for Multi–Souce Warehouse Consistency," pp. 146–157 (1996).
Patrick Valduriez, "Join Indices," ACM Transactions on Databae Systems, vol. 12, No. 2, pp. 218–246 (Jun. 1987).
Jennifer Widom, "Research Problems in DAta Warehousing," CIKM, pp. 25–30 (1995).

Richard Winter, "B2B Active Warehousing: Data on Demand," Teradata Review Fall 2000, pp. 1–5, printed from http://www.teradatamagazine.com (2000).
Nick Roussopoulos, "Materialized Views and Data Warehouses," SIGMOD Record 27(1), pp. 21–26 (1998).
Kenneth A. Ross et al., "Materialized View Maintenance and Integrity Constraint Checking: Trading Space for Time," SIGMOD, pp. 447–458 (1996).
TPC Benchmark™R, Standard Specification Revision 2.1.0, pp. 1–144 (1993).
Jose A. Blakeley et al., "Updating Derived Relations: Detecting Irrelevant and Autonomously Computable Updates," ACM Transactions on Database Systems, vol. 14, No. 3, pp. 369–400 (Sep. 1989).
Surajit Chaudhuri et al., "An Overview of Data Warehousing and OLAP Technology," SIGMOD Record 26(1), pp. 65–74 (1997).
Latha S. Colby et al., "Supporting Multiple View Maintenance Policies," SIGMOD, pp. 405–416 (1997).
Venky Harinarayan et al., "Implementing Data Cubes Efficiently," SIGMOD, pp. 205–216 (1996).
H.V. Jagadish et al, "View Maintenance Issues for the Chronicle Data Model," PODS, pp. 113–124 (1995).

* cited by examiner

*Primary Examiner*—Diane D. Mizrahi
*Assistant Examiner*—Yicun Wu
(74) *Attorney, Agent, or Firm*—Trop, Pruner & Hu, P.C.

(57) ABSTRACT

A method and apparatus determines (1) if a materialized view can be used to respond to a query for data stored in one or more base tables of a database system; and/or (2) if the materialized view needs to be updated in response to an update query. A query expression tree represents the query, and a materialized view expression tree represents the materialized view. The components of the query expression tree are compared with components of the materialized view expression tree to determine if the materialized view covers the query that is, the tuples in the result of the query expression are a subset of the tuples in the result of the materialized view expression.

27 Claims, 13 Drawing Sheets

~M = ENTIRE GRAY REGION

EXPRESSION TREE FOR A > 10 AND (A = 150 OR A < 100)

AND LIST IN BOTH QUERY EXPRESSION TREE
AND MATERIALIZED VIEW EXPRESSION TREE

QUERY EXPRESSION TREE IS BROKEN DOWN FIRST

MATERIALIZED VIEW EXPRESSION TREE IS BROKEN DOWN FIRST

A COVERS C

B COVERS C

A COVERS D

B COVERS D

TERMS IN QUERY EXPRESSION TREE ARE BROKEN DOWN FIRST

A COVERS C OR B COVERS C

AND

A COVERS D OR B COVERS D

TERMS IN MATERIALIZED VIEW EXPRESSION TREE ARE BROKEN DOWN FIRST

| A | COVERS | C | AND | A | COVERS | D |

OR

| B | COVERS | C | AND | B | COVERS | D |

DETERMINING MATERIALIZED VIEW COVERAGE

BACKGROUND

A database management system, or DBMS, typically stores vast amounts of data. The data is organized in tables, also known as relations. The tables include rows, also known as tuples, and columns, also known as attributes. In addition to the data itself, the DBMS may include data structures of various types that facilitate efficient query processing.

For example, a view is a table that is derived by specifying a query, such as a join operation, on one or more base tables. Each time the view is referenced, the query is typically recomputed. A materialized view, by contrast, is a view that need not be recomputed, but is stored in the DBMS.

A materialized view is constructed from a query specification and the data from base table(s) referenced by the query. The DBMS stores the results of the query specification in the materialized view. In a typical DBMS, different materialized views may be maintained.

Where queries can be answered by referring to the precomputed result in the materialized view, the query is answered much more quickly than if the results were computed from the base tables themselves. In this way, the materialized view provides an alternative access path for certain queries.

Like a cache, data within the materialized view becomes stale as the content of base tables change. For example, as new data is added to a base table, the materialized view constructed from the base table is updated as well. This is known as materialized view maintenance. Materialized view maintenance typically adds significantly to the overhead of the DBMS.

Two types of operations within a DBMS are related to materialized views. First, in response to a query involving base tables, a materialized view produces the desired result if the result is contained in the materialized view. Second, modification of a base table may or may not cause the materialized view to become stale. To support and use materialized views efficiently in a DBMS, a determination must be made whether the row set resulting from one search condition is contained in another row set resulting from another search condition. Maintenance of the materialized view sometimes involves substantial oversight by the DBMS.

SUMMARY

In general, a more efficient method and apparatus of using a materialized view is provided. For example, a method for use in a database system includes associating a query expression tree with a query for data in one or more base tables in the database system and comparing the query expression tree with a materialized view expression tree. The materialized view expression tree represents a materialized view of the one or more base tables of the system. An indicator of a result of the comparing is produced.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

According to some embodiments described herein, a "covers" algorithm is used to ascertain whether a query can be rewritten to use a materialized view, rather than the base tables, for efficient processing of the query. Further, the covers algorithm is able to ascertain whether updates to the materialized view are needed in response to updates to the base tables.

Figure 1:
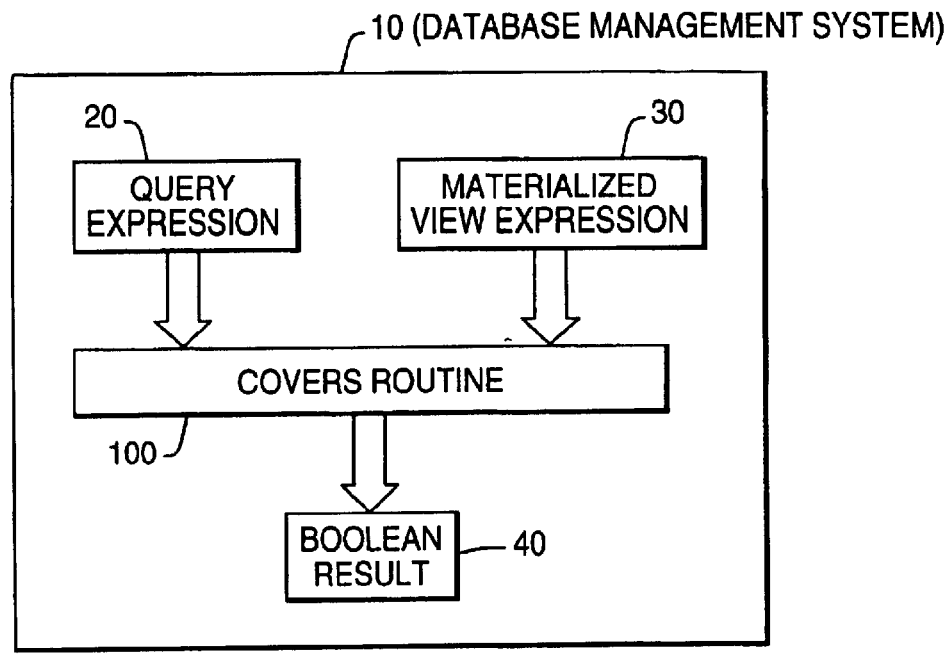
FIG. 1 is a block diagram of a covers routine according to one embodiment of the invention.

As depicted in FIG. 1, according to one embodiment, the covers algorithm is implemented by a "covers" routine or function 100 that executes in a database management system (DBMS) 10. The covers routine 100 takes two parameters: a query expression 20 and a materialized view expression 30. The covers routine 100 returns a boolean result 40, either TRUE or FALSE, which depends on whether the materialized view expression 30 "covers" the query expression 20.

The covers routine 100 is expressed as covers (Q, M), where Q represents the query expression 20 and M represents the materialized view expression 30. The second expression (M) is said to cover the first expression (Q) if the rows satisfying the first expression (Q) are contained in the set of rows satisfying the second expression (M). This containment of rows is true regardless of the actual content of the database.

Figure 2A:
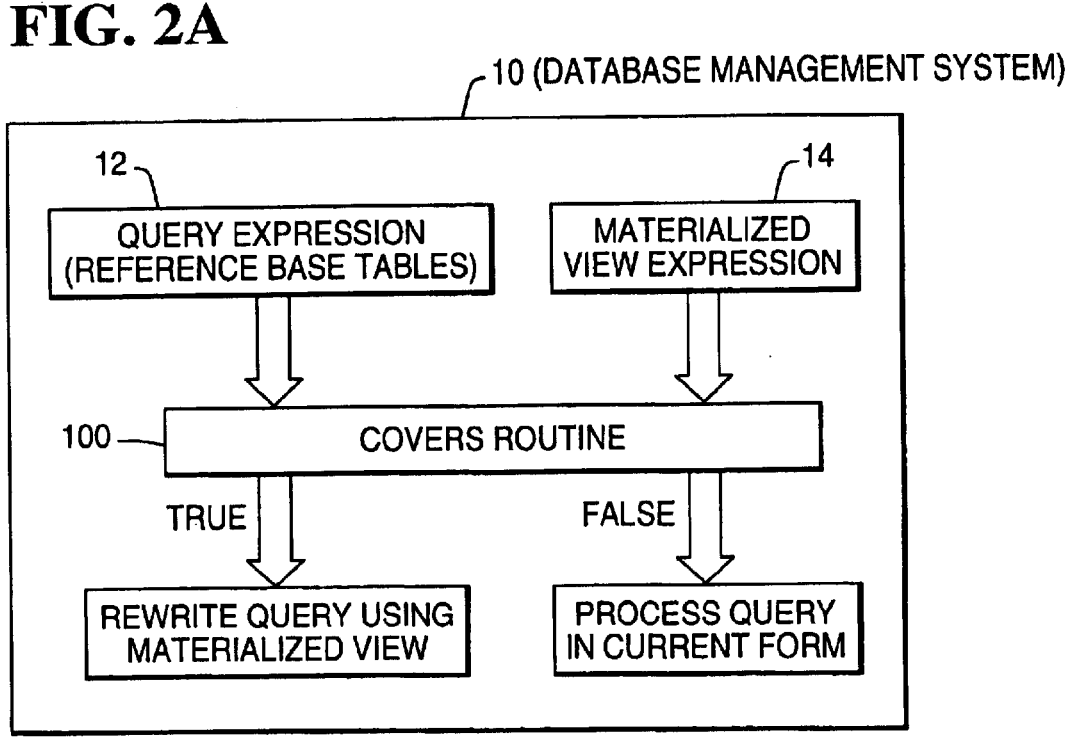
FIGS. 2A and 2B are block diagrams illustrating inputs to and outputs from the covers routine.

As shown in FIG. 2A, the covers routine 100 is used to determine whether a query can be rewritten to use a materialized view. A query expression 12 referencing one or more base tables is received in the DBMS 10. The covers routine 100 compares the query expression 12 to a known materialized view expression 14, producing a boolean output. If the covers routine 100 returns TRUE, the query is rewritten using the materialized view. If the covers routine 100 returns FALSE, the query remains unchanged.

Put another way, if the content of the materialized view covers the query in question, the materialized view, rather than the base tables, is used to respond to the query. Thus, the query is rewritten with the materialized view in mind. The materialized view is said to cover the query if the rows in the result of Q are a subset of the rows in the result of M. In other words, the set of rows satisfying the search condition M completely contain the set of rows satisfying Q.

A benefit offered by the covers routine 100 is that it is able to process query expressions Q and materialized view expressions M of arbitrary complexity. The covers routine 100 performs processing that is an enhancement of conventional techniques of determining whether a materialized view can be used to satisfy a query.

Figure 2B:
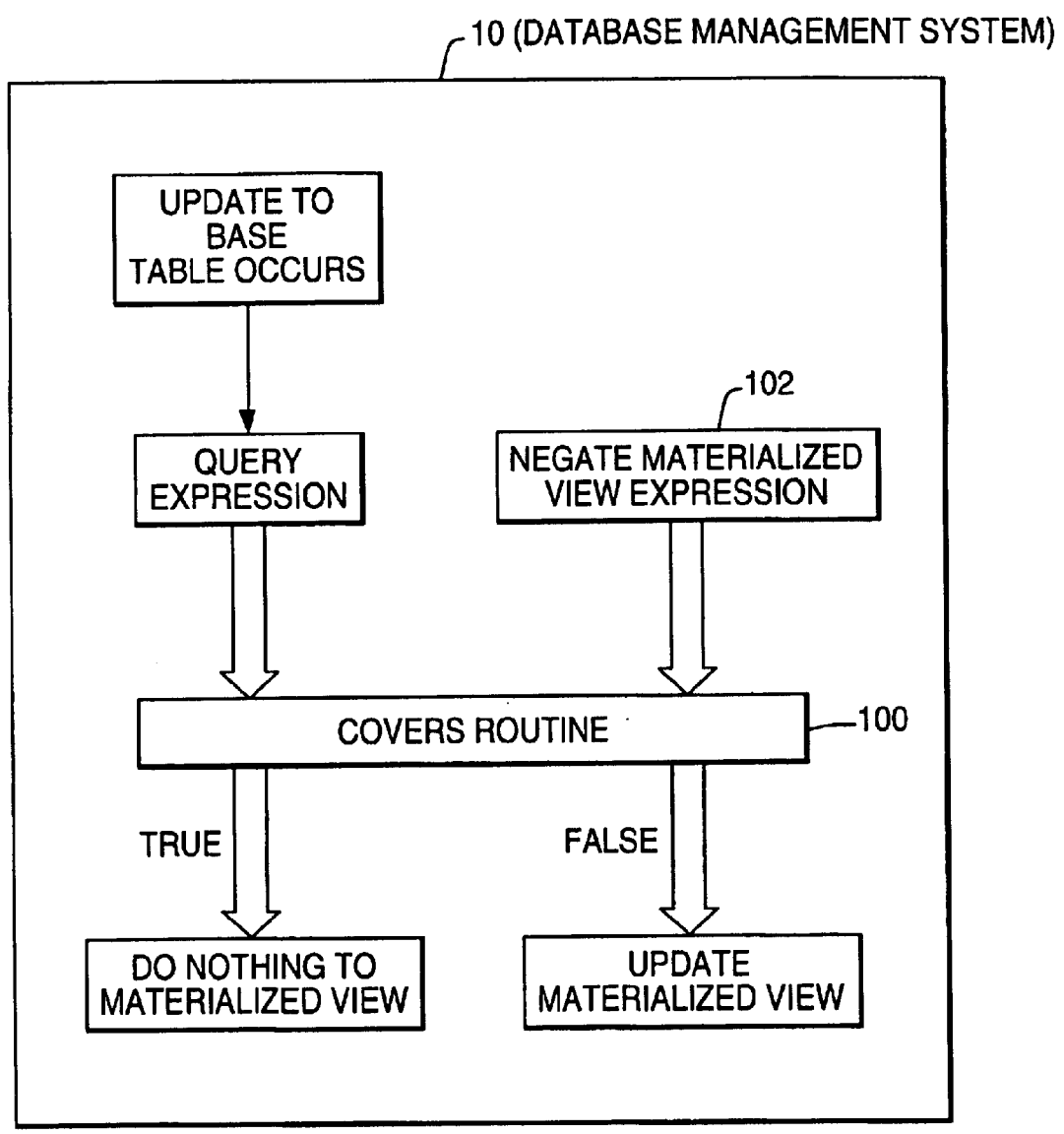

As described in FIG. 2B, the covers routine 100 can also be used to determine whether the materialized view needs an update due to modification of a base table, such as adding rows, updating rows, or deleting rows. In one embodiment, if there is an intersection between the row set affected by the update operation and the row set in the materialized view, the materialized view is updated. Otherwise, no update to the materialized view is performed.

Figure 3A:
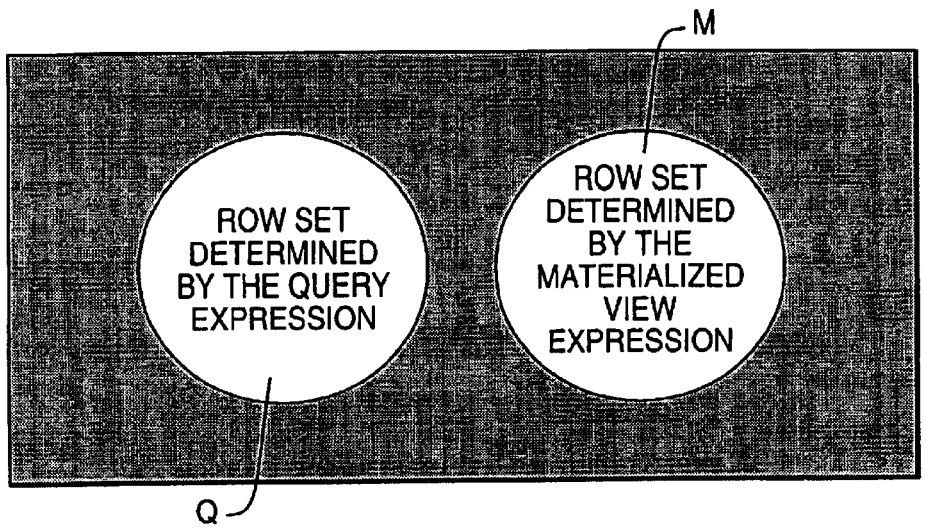
FIGS. 3A and 3B are Venn diagrams illustrating how an intersection problem may be converted to a coverage problem.
Figure 3B:
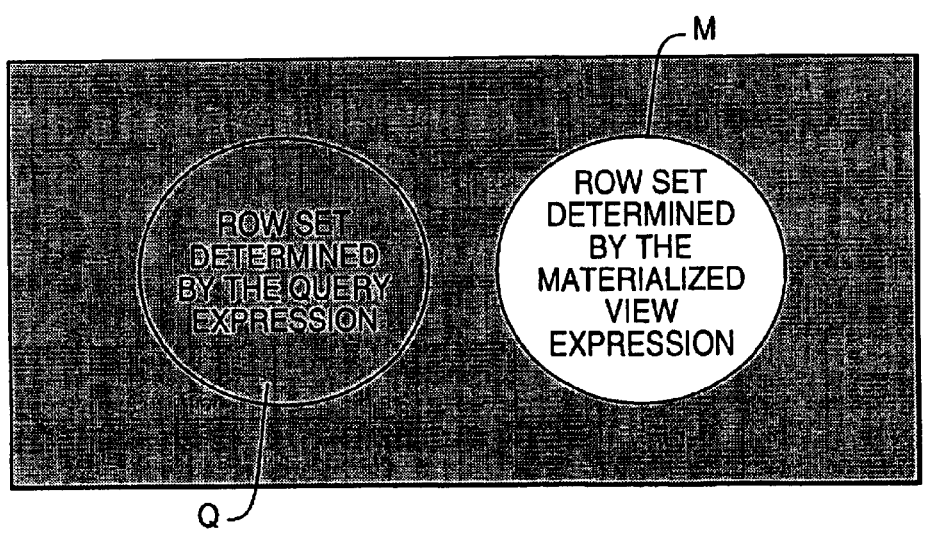

Whether there is "intersection" between the two row sets can be restated as a "coverage" question, using the following logic. For query expression Q and materialized view expression M, M is disjoint (e.g., there is no intersection) from Q if and only if ~M ("not" M) covers Q. This point is illustrated in the Venn diagram of FIG. 3A. The circles M and Q do not intersect. The gray area of the diagram, shown in FIG. 3B, represents ~M. In one embodiment, maintenance is required for query Q if it can be shown that ~M does not cover Q. In other words, if covers (Q, ~M) is false, then maintenance of the materialized view is performed.

Accordingly, in FIG. 2B, the materialized view expression (M) is negated (at 102) and provided to the covers routine 100, along with the query expression Q. If the covers routine 100 returns TRUE, the materialized view remains untouched. If the covers routine 100 returns FALSE, however, the materialized view is updated.

As explained above, the covers routine 100 takes two expressions as input and returns a boolean value as output. In one embodiment, the expressions are in the form of expression trees. Expression trees are recursive structures that represent query search conditions.

Figure 4A:
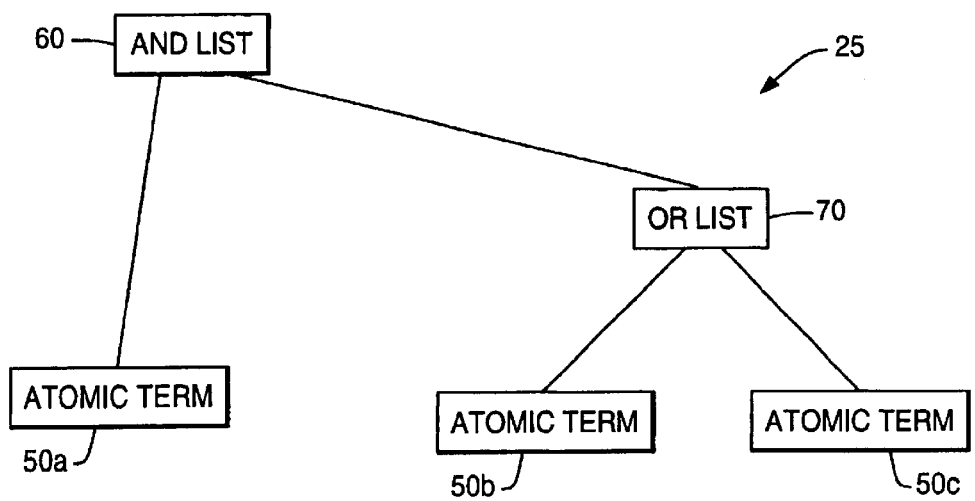
FIGS. 4A and 4B illustrate expression trees.

An example of an expression tree is illustrated in FIG. 4A. Expression tree 25 includes three types of nodes: an AND list 60, an OR list 70, and atomic terms 50. FIG. 4A is illustrative of one configuration of an expression tree. Expression trees may include some, but not all, of these nodes, or may include multiple levels and combinations of the described nodes.

The AND list 60 includes a list of expressions connected together with a boolean AND operation. Expressions connected in an AND list are known as conjuncts. The OR list 70 includes of a list of expressions connected together with a Boolean OR operator. Expressions connected in an OR list are known as disjuncts.

Atomic terms are those nodes in which a column or attribute is compared by an operator to a constant value. Alternatively, the atomic term may include a declaration that a column is or is not NULL.

Figure 4B:
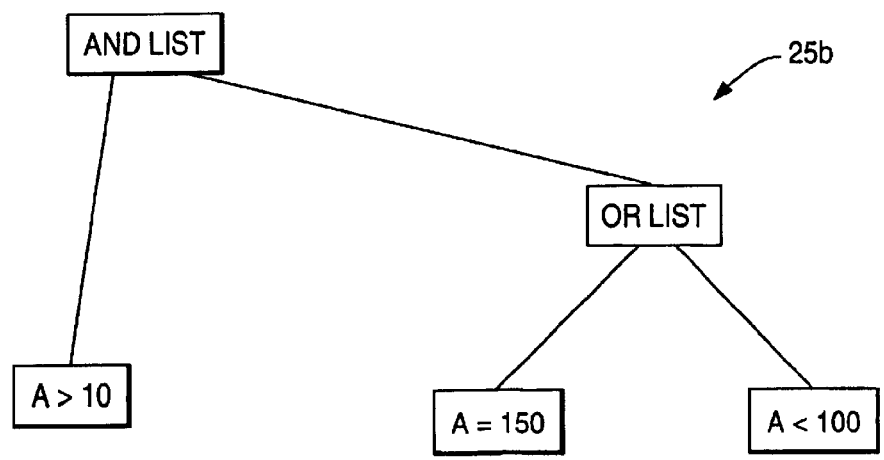

An expression tree for the expression A>10 AND (A=150 OR A<100) is illustrated in FIG. 4B. The three atomic terms are A>10, A=150, and A<100. A is the name for a column (attribute) of a table (relation).

In one embodiment, the covers routine 100 traverses the query expression tree and the materialized view expression tree recursively. Each part of each tree is checked for coverage. In one embodiment, a set of rules is observed while checking for coverage. These rules are illustrated in FIGS. 5A through 5D.

Figure 5A:
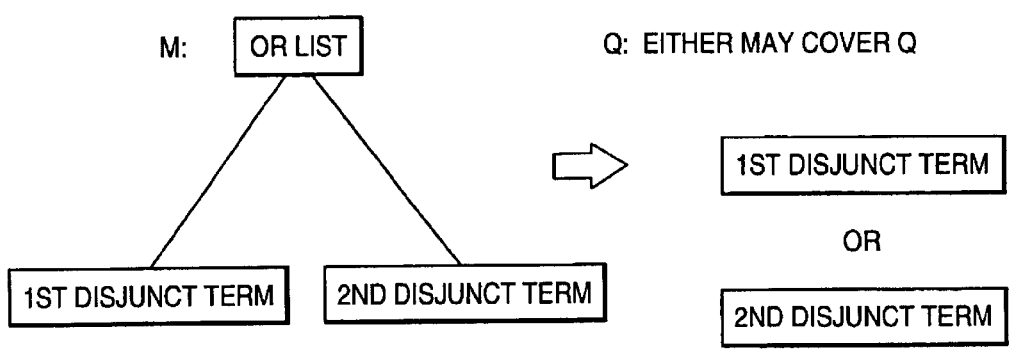
FIGS. 5A through 5D illustrate rules employed by the covers routine according to one embodiment of the invention.

The first rule used by the covers routine 100 is depicted in FIG. 5A, according to one embodiment. Where M is an OR list including a first disjunct term and a second disjunct term, M is said to cover Q if either disjunct term covers Q. If either the first disjunct term covers Q or the second disjunct term covers Q, M is said to cover Q.

Figure 5B:
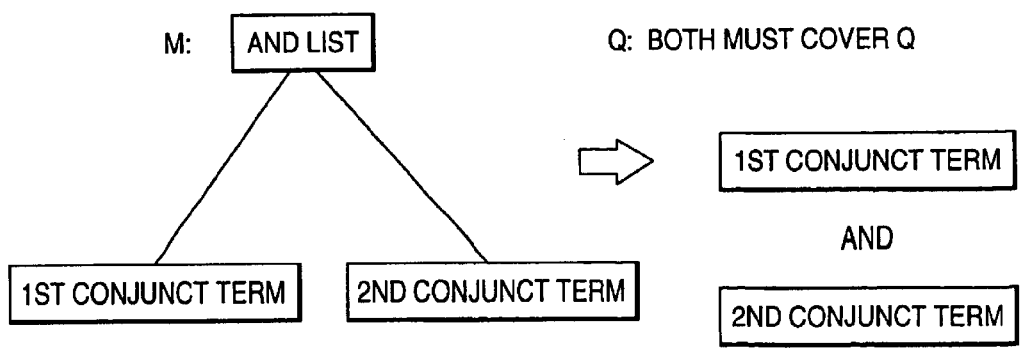

A second rule employed by the covers routine 100 is depicted in FIG. 5B. In this case, M is an AND list that includes a first conjunct term and a second conjunct term. For M to cover Q, both the first conjunct term and the second conjunct term must cover Q.

Figure 5C:
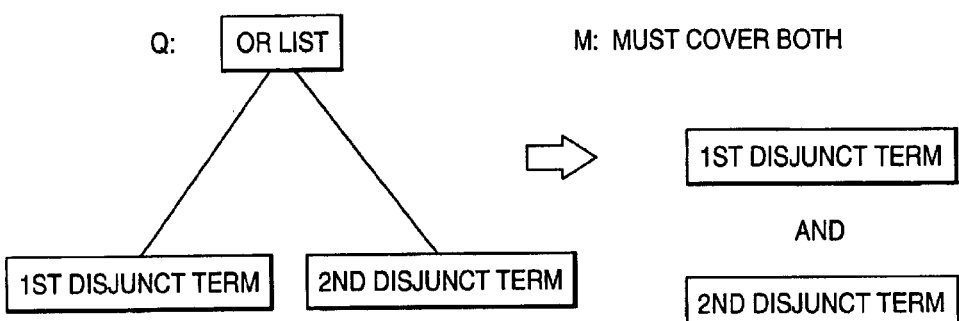

For the third and fourth rules, the query expression tree (Q) is first observed rather than the materialized view expression tree (M). In the third rule, where the query expression tree (Q) is an OR list including a first disjunct term and a second disjunct term, M covers Q if M covers both the first disjunct term and the second disjunct term. The third rule is depicted in FIG. 5C, according to one embodiment.

Figure 5D:
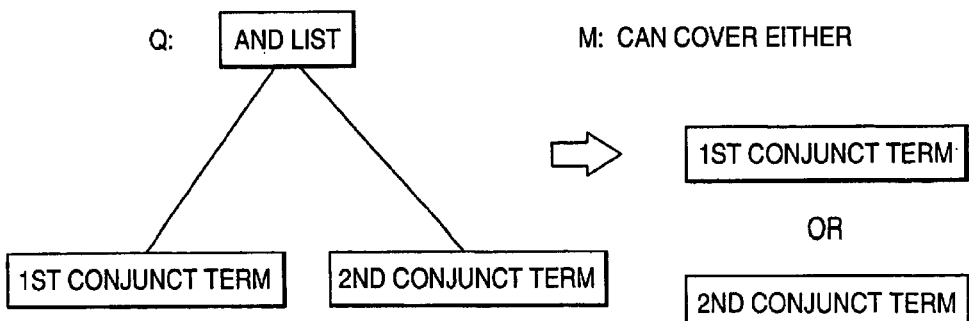

According to the fourth rule, if the query expression tree (Q) is an AND list including a first conjunct term and a second conjunct term, M covers Q if M covers either the first conjunct term or the second conjunct term of Q. The fourth rule is depicted in FIG. 5D, according to one embodiment.

The four rules pertain to the nodes which are either OR lists or AND lists. The third type of node, atomic terms, occupy the "leaves," or the bottom nodes, of the expression trees. In one embodiment, the atomic terms are checked, not necessarily by the covers routine 100, but by a separate routine called SAT( ). SAT( ) takes two conjunctive form expressions and returns TRUE if there are values for the column references that would satisfy both expressions. The SAT( ) routine returns FALSE when two conditions that are tested to be contradictory, and returns TRUE when there is intersection.

Figure 6A:
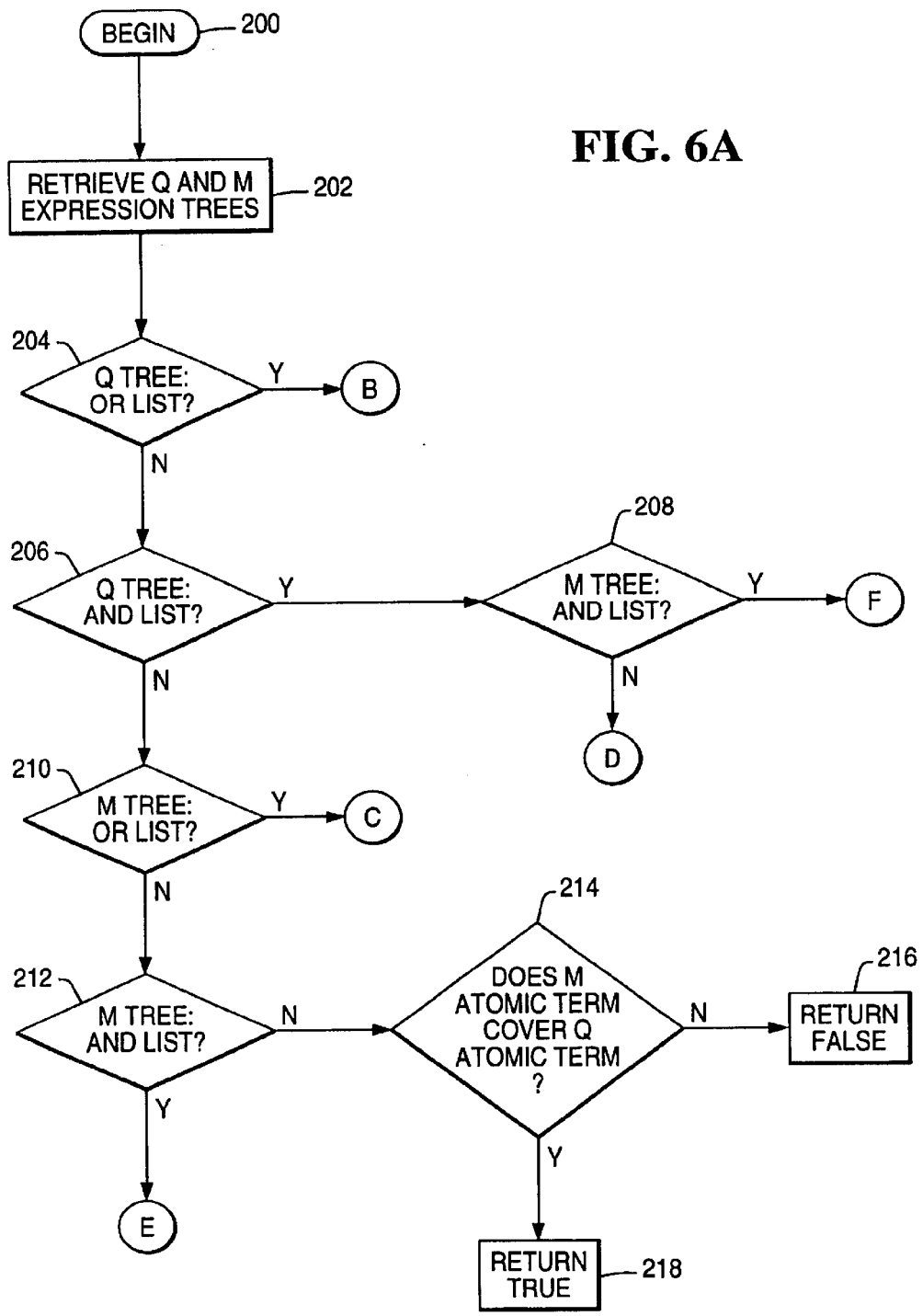
FIGS. 6A through 6F are flow diagrams of a process performed by the covers routine according to one embodiment of the invention.

Operation of the covers routine 100 according to one embodiment is depicted in the flow diagrams of FIGS. 6A through 6F. In FIG. 6A, characteristics of both the query and the materialized view expression trees are ascertained. Accordingly, the query expression tree and the materialized view expression tree are retrieved (block 202).

In one embodiment, if the top or root of the query expression tree (Q) represents an OR list, each term in the OR list is checked for coverage against the materialized view expression tree (M). If any of the terms are not covered, the covers routine 100 returns FALSE, otherwise the covers routine 100 returns TRUE. Accordingly, in FIG. 6A, the query expression tree (Q) is checked for the presence of an OR list (diamond 204). If an OR list is found, control proceeds to a second flow diagram, in FIG. 6B.

Figure 6B:
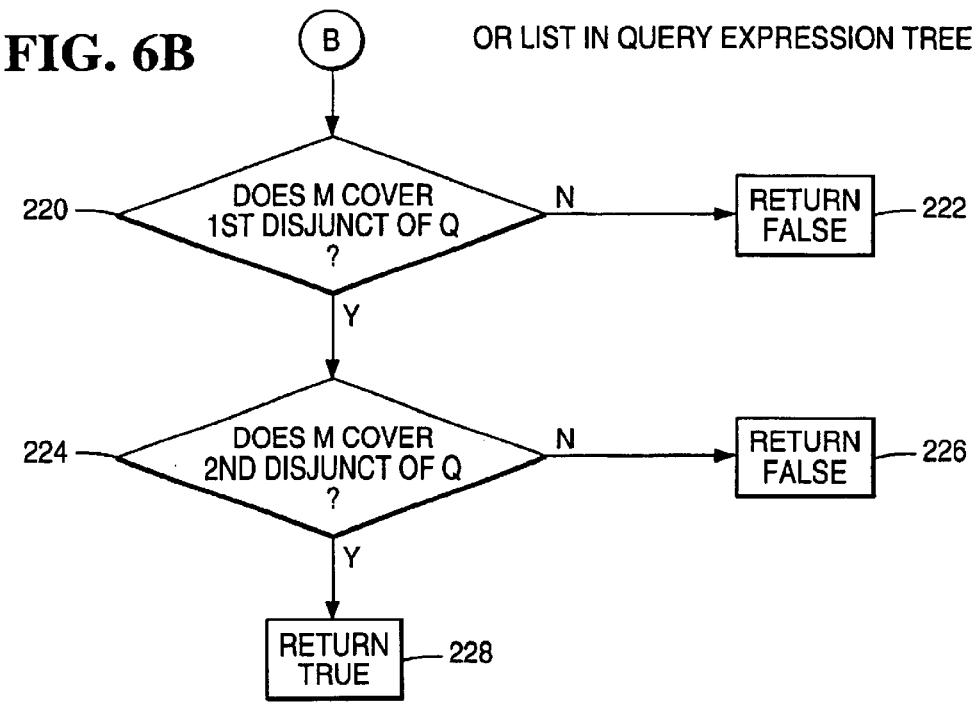

Turning to FIG. 6B, the materialized view expression tree is used to check each term in the query expression tree. Since the query expression tree (Q) includes an OR list, the query expression tree comprises two disjuncts of the OR list. Accordingly, these disjuncts are checked in FIG. 6B to ascertain whether the materialized view expression tree covers them (diamonds 220 and 224). Where the materialized view expression tree does not cover the disjunct of the query expression tree, the covers routine 100 returns FALSE (blocks 222 and 226). However, if the materialized view expression tree covers both the first disjunct and the second disjunct of Q, the covers routine 100 returns TRUE (block 228).

Returning to FIG. 6A, where the query expression tree (Q) does not include an OR list (the "no" prong of diamond 204), the covers routine 100 determines whether the query expression tree includes an AND list (diamond 206). If so, the covers routine 100 then ascertains whether the materialized view expression tree (M) includes an AND list (diamond 208). If so, control proceeds to FIG. 6F.

Figure 6C:
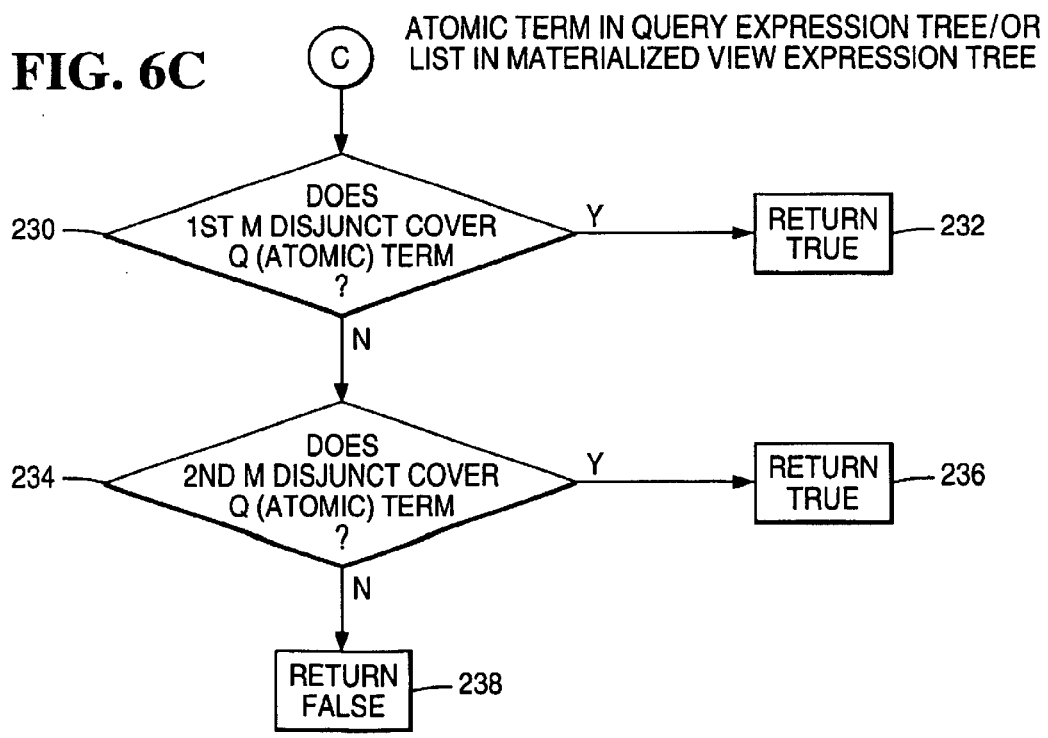
Figure 6D:
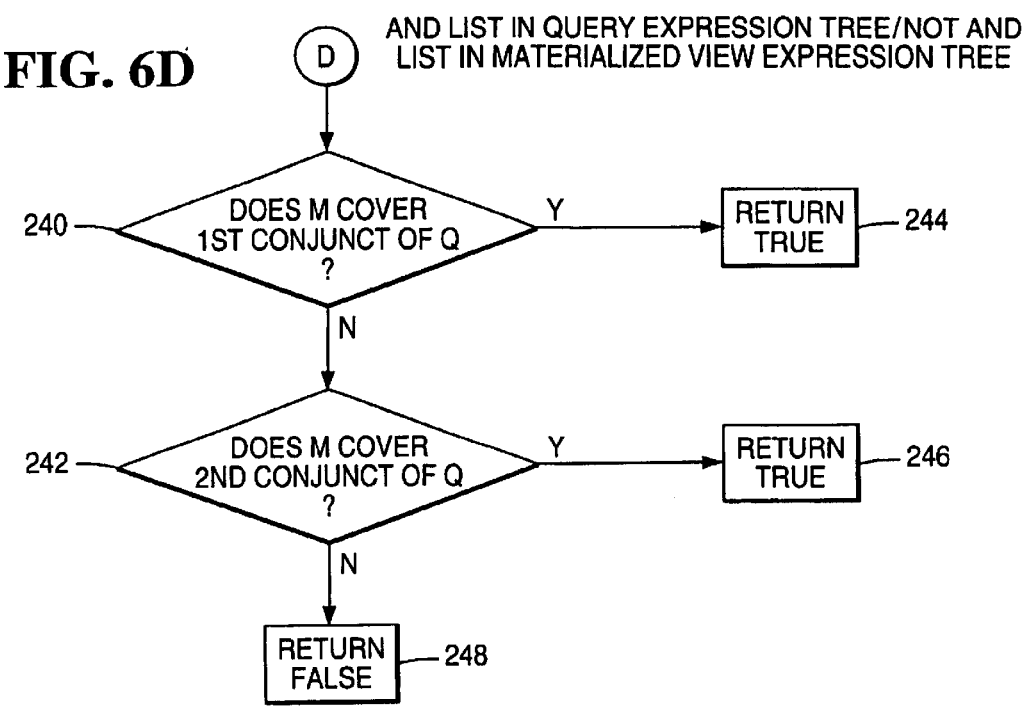
Figure 6E:
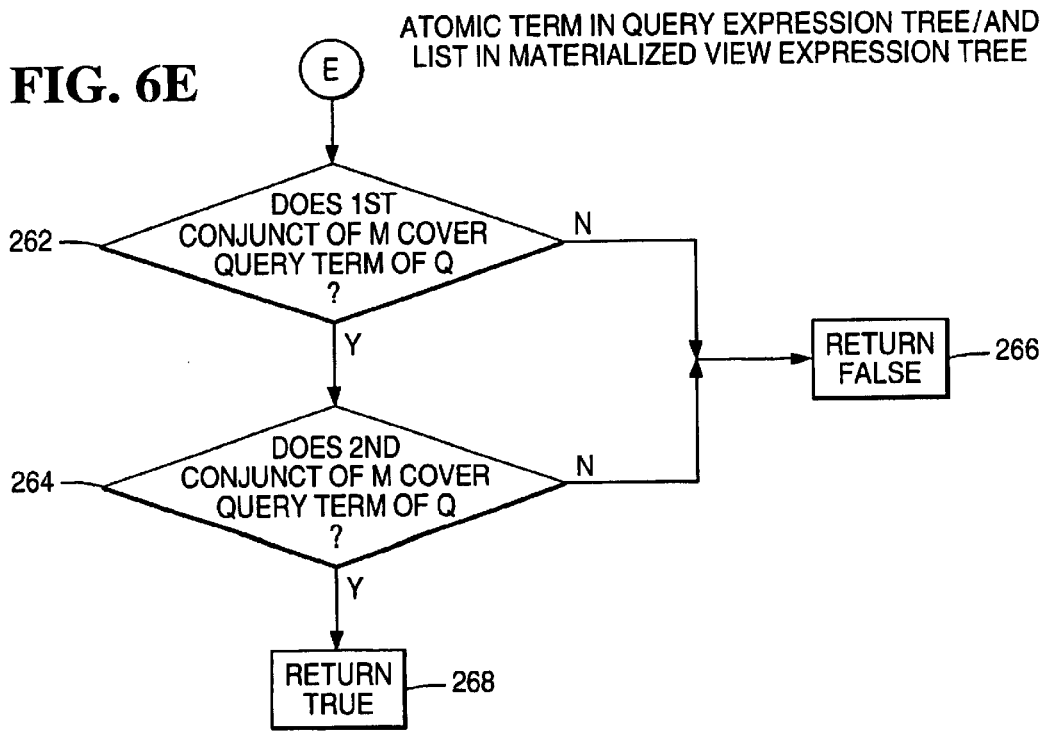
Figure 6F:
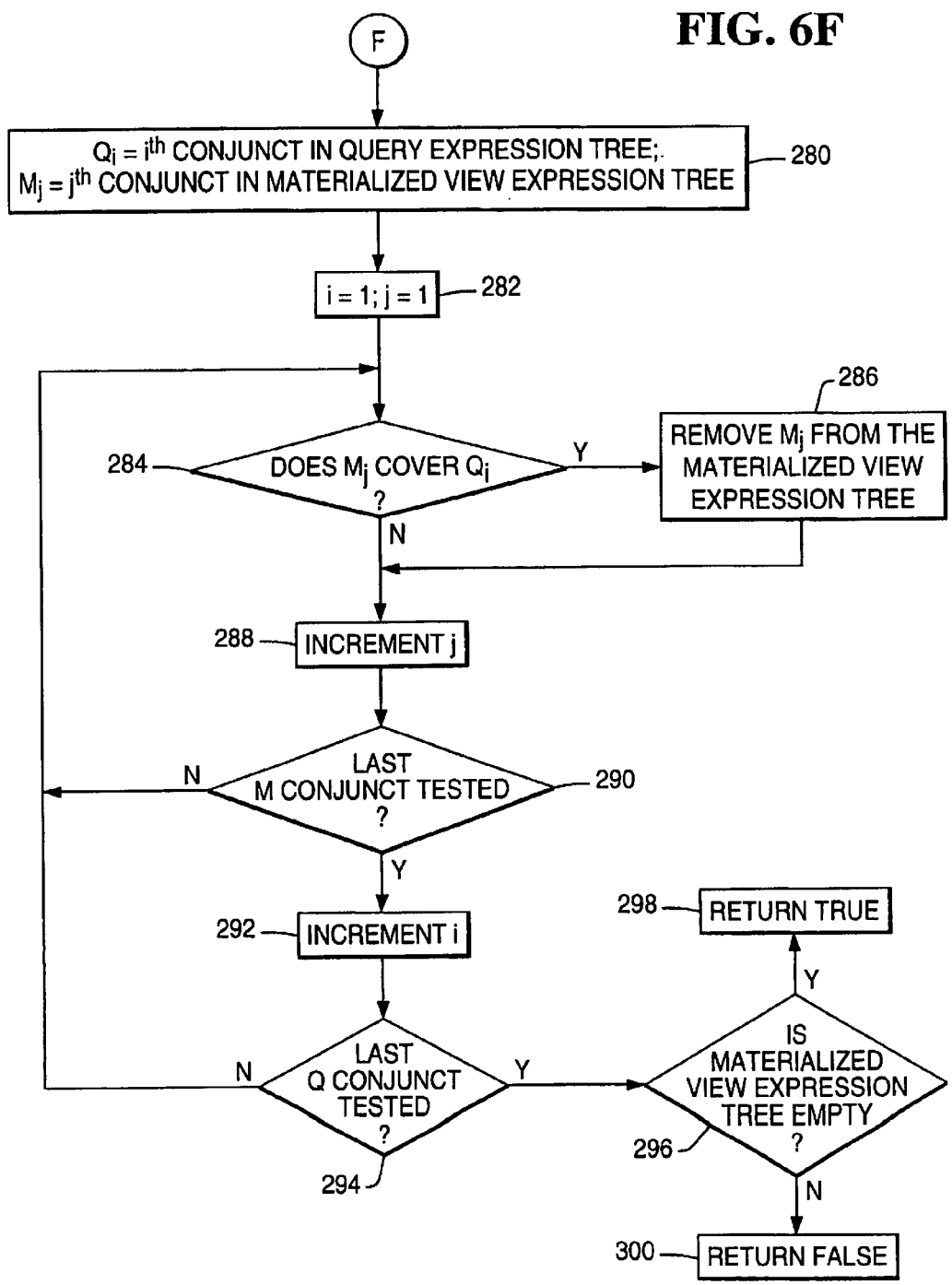

Turning to FIG. 6F, if the query expression tree includes an AND list and the materialized view expression tree also includes an AND list, each term in the materialized view expression tree is checked against each term in the query expression tree, according to one embodiment. $Q_i$ is defined as the ith conjunct in the query expression tree, and $M_j$ is defined as the jth conjunct in the materialized view expression tree (block 280). The values of i and j are set to one to begin a recursive procedure.

Whenever a conjunct $M_j$ in the materialized view expression tree covers a conjunct $Q_i$ in the query expression tree (diamond 284), the conjunct $M_j$ is removed from the materialized view expression tree (block 286). The value of j is incremented (block 288) to test the next conjunct $M_j$ until the last conjunct $M_j$ has been tested (block 290). Then, the value of i is incremented (block 292) until the last conjunct $Q_i$ has been tested (diamond 294). If, in the end, the materialized view expression tree becomes empty (diamond 296), the covers routine 100 returns TRUE. Otherwise, the covers routine 100 returns FALSE.

Returning to FIG. 6A, where the query expression tree Q includes an AND list but the materialized view expression tree is determined not to include an AND list (the "no" prong of diamond 208), control proceeds to FIG. 6D. In one embodiment, the covers routine 100 checks each term in the query expression tree for coverage in the materialized view expression tree (diamonds 240 and 242). Since the materialized view tree does not include an AND list, the expressions compared may either be atomic expressions or disjunct expressions, e.g., elements of an OR list. If any of the terms in the query expression tree are covered by terms in the materialized view expression tree, the covers routine 100 returns TRUE (block 244 and 246). If all of the terms in the query expression tree are deemed not to be covered by the materialized view expression tree, the covers routine 100 returns FALSE (block 248).

Returning to FIG. 6A, where the query tree is determined not to include an AND list (the "no" prong of diamond 206), the covers routine 100 checks to see whether the materialized view tree includes an OR list (diamond 210). Also, at this point in the flow diagram, it is known that the Q tree includes neither an OR list nor an AND list, but only atomic terms. Where an OR list is found in the materialized view tree (the "yes" prong of diamond 210), control proceeds to FIG. 6C.

Where an atomic term is found in the query expression tree and an OR list is in the materialized view expression tree, the covers routine 100 checks to see that at least one term in the materialized view expression tree covers the query expression tree. If none does, the covers routine 100 returns FALSE; otherwise, the routine 100 returns TRUE. Turning to FIG. 6C, since the materialized view contains an OR list, two disjuncts are checked to see whether they cover the atomic term in the query expression tree (diamonds 230 and 234). If so, the covers routine 100 returns TRUE (blocks 232 and 236). Where neither materialized view disjunct covers the atomic term of the query expression tree, the covers routine 100 returns FALSE (block 238).

Returning to FIG. 6A, where an OR list is not found in the materialized view expression tree (the "no" prong of diamond 210), the covers routine 100 checks to see whether the materialized view tree includes an AND list (diamond 212). If so, control proceeds to FIG. 6E.

At this point, it is known that the query expression tree includes an atomic term and that the materialized view expression tree includes an AND list. Thus, in FIG. 6E, the two conjuncts of the materialized view expression tree are compared to see whether they cover the atomic term of the query expression tree (diamonds 262 and 264). For either conjunct, if they do not cover the query atomic term, the covers routine 100 returns FALSE (block 266). On the other hand, if both conjuncts cover the atomic term of the query expression tree, the covers routine 100 returns TRUE (block 268).

Returning to FIG. 6A, where no AND list is found in the materialized view expression tree (the "no" prong of diamond 212), the covers routine 100 checks between the atomic terms to determine whether the materialized view atomic term covers the query atomic term (diamond 214). If so, the covers routine 100 returns TRUE (block 218). Otherwise, the covers routine 100 returns FALSE (block 216).

In one embodiment, the covers routine 100 described above is optimized to achieve more accurate results. The covers routine 100 has optimized the way of breaking down the materialized view expression tree and query expression tree to make the coverage test as accurate as possible. Since the covers algorithm is a polynomial algorithm that solves the problem of testing coverage between two expressions of arbitrary complexity, which is believed to be NP-hard (non-polynomial-hard), the covers algorithm gives an approximate solution to the real problem. Here, specifically, the covers algorithm tests are sufficient but not necessary conditions of coverage. In other words, when the algorithm returns TRUE, there is definitely coverage. On the other hand, when the algorithm returns FALSE, it may be a "false" FALSE, meaning that the algorithm claims no coverage when in fact the materialized view does cover the query. However, the algorithm has been optimized to approximate the true solution as closely as possible.

As described above, the covers (Q, M) routine 100 basically breaks down the expression lists in M and Q recursively until reaching the base case of a pair of atomic terms. The breaking down of the expression lists enlarges or shrinks the row sets determined by the expressions. This could be the reason for "false" FALSE if the breaking down is not done methodically. For example, when both M and Q are AND lists, M: A and B
Q: C and D.

Figure 7A:
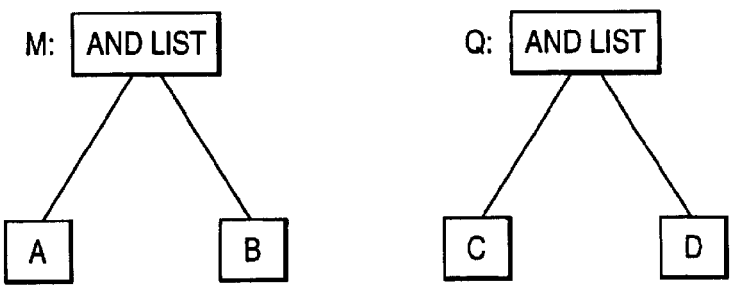
FIGS. 7A through 7C illustrate a first optimization in the covers algorithm.
Figure 7A:

These expressions are depicted in FIG. 7A. Operation of the covers algorithm where both M and Q are AND list expressions is depicted in FIG. 6F, above. Although FIG. 6F illustrates $M_1$ getting tested against $Q_1$, $Q_2$, and so on, before $M_2$ gets tested, the operation may instead be performed where j is incremented (see block 288) such that $M_1$, $M_2$, and so on are tested against $Q_1$ first, and so on.

Stated mathematically, if the list in the query Q is broken down first, the covers algorithm tests:

(A and B) vs C
(A and B) vs D

Figure 7B:
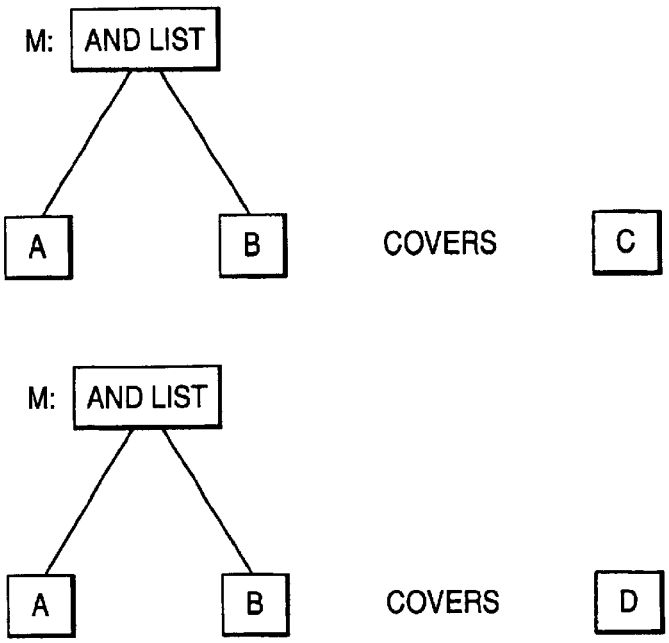

These operations are depicted in FIG. 7B. The set determined by C alone may be significantly bigger than the set determined by (C and D), for some sets C and D. The test case, however, asks whether (A and B) covers C or (A and B) covers D in order to return TRUE to the coverage problem between (A and B) and (C and D).

Thus, in one embodiment, the covers routine 100 eliminates this artificial enlargement of the query set when breaking down the Q term list as much as possible. The covers algorithm uses "double loop checking." Accordingly, instead of the above tests, the covers routine 100 tests:

A vs C
B vs C

A vs D

B vs D.

Figure 7C:
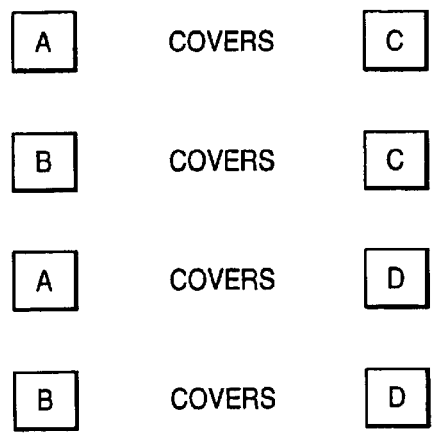

These operations are depicted in FIG. 7C and the flow is illustrated in FIG. 6F, according to one embodiment. Both the conditions in the materialized view and the query have been relaxed to increase the possibility of the covers routine returning TRUE. Also, the term in M is removed as soon as it is found to cover one of the terms in Q.

In one embodiment, the optimization depicted in FIGS. 7C and 6F improves the running time of the test. In the above example, the recursive test will hit the base case four times while the double loop checking may save up to two calls to SAT( ) depending on the coverage between the terms. Based on these considerations, in one embodiment, the double loop checking is used instead of simply breaking down the lists to two AND list term cases.

In the case of two OR term lists, it may be advantageous to break down the Q list first. (Recall that FIG. 6B illustrates an operation where the query expression tree includes an OR list.) Consider the case where both the materialized view expression tree and the query expression tree include OR lists as follows:

M: A or B

Q: C or D.

Figure 8C:
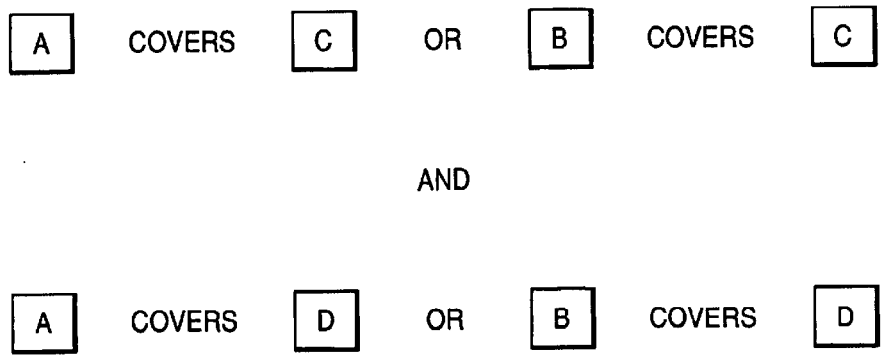
FIGS. 8A through 8C illustrate a second optimization in the covers algorithm.
Figures 8A, 8B:
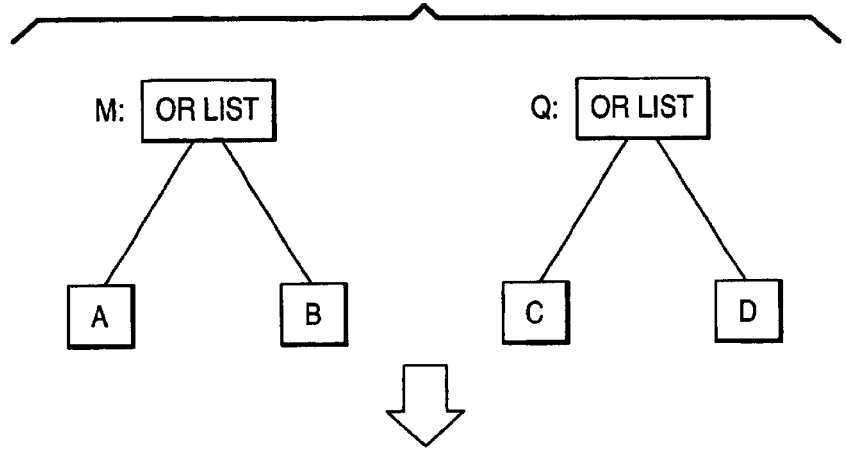

These expressions are depicted in FIG. 8A. The expression that breaks up the terms in the M list first is:

(A covers (C OR D)) OR (B covers (C OR D))=((A covers C) AND (A covers D)) OR ((B covers C) AND (B covers D))

as depicted in FIG. 8B. The expression that breaks up the terms in the Q list first is:

((A OR B) covers C) AND ((A OR B) covers D))=((A covers C) OR (B covers C)) AND ((A covers D) OR (B covers D)).

as depicted in FIG. 8C. Note that the query is covered in the second case if:

(A covers C) AND (B covers D) or (B covers C) AND (A covers D).

These are two possibilities for coverage that exist in addition to the case identified by the M base tests:

(A covers C) AND (A covers D) or (B covers C) AND (B covers D).

According to these formulas, there are more possibilities to get coverage if the query is separated first rather than the materialized view. So, in one embodiment, the covers routine 100 breaks the Q list first, as shown in FIG. 6B.

Where, instead, the materialized view expression tree includes an AND list and the query expression tree includes an OR list, it does not matter which expression tree is broken down first, the same result is produced. All pairs of terms between the materialized view and the query have AND relations so all of them have to return TRUE in order for the covers algorithm to return TRUE.

Where the materialized view includes an OR list and the query includes an AND list, either the materialized view list can be broken down or the query list can be broken list; the result is identical. All pairs of terms between M and Q have OR relations, so the covers algorithm returns TRUE when one of the pairs returns TRUE.

The various devices and systems discussed each includes various software routines or modules, such as the covers routine 100. Such software routines or modules are executable on corresponding control units. Each control unit includes a microprocessor, a microcontroller, a processor module (including one or more microprocessors or microcontrollers), or other control or computing devices. As used here, a "controller" refers to a hardware component, software component, or a combination of the two. Although used in the singular sense, a "controller" can also refer to plural hardware components, plural software components, or a combination thereof.

The storage units referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various devices or systems are stored in respective storage units. The instructions when executed by a respective control unit cause the corresponding device or system to perform programmed acts.

The instructions of the software routines or modules are loaded or transported to each device or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system, comprising:

associating a query expression tree with a query for data in one or more base tables in the database system;

comparing the query expression tree with a materialized view expression tree, wherein the materialized view expression tree represents a materialized view of the one or more base tables of the system; and producing an indicator of a result of the comparing.

2. The method of claim 1, further comprising responding to the query with data from the materialized view in response to the indicator having a first state, and responding to the query with data from the one or more base tables in response to the indicator having a second state.

3. The method of claim 2, further comprising updating the materialized view if the query causes an update of the one or more base tables.

4. The method of claim 1, wherein comparing the query expression tree and materialized view expression tree comprises recursively traversing the query expression tree and materialized view expression tree to determine if the materialized view covers the query.

5. The method of claim 4, wherein comparing the query expression tree with the materialized view expression tree comprises:

identifying a first node in the query expression tree; and comparing the first node with a second node in the materialized view expression tree.

6. The method of claim 5, wherein comparing the query expression tree with the materialized view expression tree further comprises:

determining that the first node is an OR list comprising a first disjunct and a second disjunct; and ascertaining whether the materialized view expression tree covers the first disjunct or the second disjunct; and wherein producing the indicator comprises indicating that the materialized view does not cover the query if either the first or the second disjunct are not covered by the materialized view expression tree.

7. The method of claim 6, wherein producing the indicator comprises indicating that the materialized view covers the query if both the first disjunct and the second disjunct are covered by the materialized view expression tree.

8. The method of claim 5, wherein comparing the query expression tree with the materialized view expression tree further comprises:

determining that the first node is an AND list comprising two conjuncts;

determining that the second node is an AND list comprising two conjuncts; and comparing every conjunct in the first node with every conjunct in the second node.

9. The method of claim 8, wherein comparing every conjunct in the first node with every conjunct in the second node comprises breaking down the conjuncts of the second node with the conjuncts of the first node.

10. The method of claim 5, wherein comparing the query expression tree with the materialized view expression tree comprises:

determining that the first node is an AND list comprising two conjuncts;

determining that the second node is not an AND list; and determining that the materialized view expression tree covers at least one of the two conjuncts of the query expression tree;

wherein producing the indicator comprises indicating that the materialized view covers the query if the materialized view expression tree covers one of the two conjuncts of the query expression tree.

11. The method of claim 5, wherein comparing the query expression tree with the materialized view expression tree comprises:

determining that the second node is an OR list comprising a first disjunct and a second disjunct;

determining that either the first disjunct or the second disjunct covers an atomic term of the query expression tree;

wherein producing the indicator comprises indicating that the materialized view covers the query if either the first disjunct or second disjunct covers an atomic term of the query expression tree.

12. The method of claim 5, wherein comparing the query expression tree with the materialized view expression tree comprises:

determining that the second node is an AND list comprising a first conjunct and a second conjunct; and determining that both the first conjunct and the second conjunct covers an atomic term of the query expression tree;

wherein producing the indicator comprises indicating that the materialized view covers the query if both the first conjunct and the second conjunct covers an atomic term of the query expression tree.

13. The method of claim 5, wherein comparing the query expression tree with the materialized view expression tree comprises:

determining that the second node is an atomic term; and determining that the atomic term covers an atomic term of the query expression tree;

wherein producing the indicator comprises indicating the materialized view covers the query if the atomic term of the second node covers an atomic term of the query expression tree.

14. An article comprising at least one storage medium containing instructions that when executed cause a database system to:

identify components of a query expression representing a query for data in one or more base tables of the database system;

identify components of a materialized view expression representing a materialized view of the one or more base tables; and compare the components of the query expression with components of the materialized view expression to determine if the materialized view can be used to respond to the query.

15. The article of claim 14, wherein the instructions when executed cause the database system to recursively traverse the components of the query expression and the materialized view expression to perform the comparing.

16. The article of claim 14, wherein the instructions when executed cause the database system to identify AND nodes in the query expression and the materialized view expression.

17. The article of claim 16, wherein the instructions when executed cause the database system to further identify OR nodes in the materialized view expression.

18. The article of claim 14, wherein the instructions when executed cause the database system to determine if the materialized view covers the query.

19. The article of claim 14, wherein the instructions when executed cause the database system to determine if tuples in a result of the query expression are a subset of the tuples in a result of the materialized view expression.

20. The article of claim 14, wherein the instructions when executed cause the database system to further determine whether or not to update the materialized view in response to an update of the one or more base tables.

21. The article of claim 20, wherein the instructions when executed cause the database system to further:

determine if a negation of the materialized view expression covers the query expression; and update the materialized view if the negation of the materialized view expression does not cover the query expression.

22. A database system comprising:

a storage subsystem to store one or more base tables and a materialized view of the one or more base tables, and a controller adapted to receive a query expression tree representing a query for data in the one or more base tables;

the controller adapted to further compare the query expression tree with a materialized view expression tree representing the materialized view to determine if tuples in a result of the query are a subset of tuples in the materialized view;

the controller adapted to further use the materialized view to respond to the query if the tuples in the result of the query are a subset of the tuples in the materialized view.

23. The database system of claim 22, wherein the controller is adapted to compare the query expression with the materialized view expression by recursively traversing a tree representing the query expression and a tree representing the materialized view expression.

24. The database system of claim 23, wherein the controller is adapted to further identify AND nodes in the query expression tree and materialized view expression tree.

25. The database system of claim 24, wherein the controller is adapted to further identify OR nodes in the query expression tree and materialized view expression tree.

26. The database system of claim 22, wherein the controller is adapted to determine if the materialized view needs to be updated in response to the query causing update of the one or more base tables.

27. The database system of claim 26, wherein the controller is adapted to update the materialized view in response to a determination that tuples in the result of the query expression are not a subset of tuples in a result of a negation of the materialized view expression.

* * * * *